(12) United States Patent
Fryan

(10) Patent No.: US 8,239,982 B2
(45) Date of Patent: Aug. 14, 2012

(54) OPENABLE TWIN TANK FLUSH BOX USING RECYCLED WATER

(76) Inventor: Hassan Mohammed S. Fryan, Riyadh (SA)

( * ) Notice: Subject to any disclaimer, the term of this patent is extended or adjusted under 35 U.S.C. 154(b) by 1176 days.

(21) Appl. No.: 11/982,993

(22) Filed: Nov. 5, 2007

(65) Prior Publication Data
US 2009/0113620 A1    May 7, 2009

(51) Int. Cl.
*A47K 4/00*    (2006.01)
(52) U.S. Cl. ...................... 4/665; 4/415; 4/644
(58) Field of Classification Search .............. 4/324–326, 4/363–364, 415, 619, 625–626, 639–644, 4/663–665, 650–651
See application file for complete search history.

(56) References Cited

U.S. PATENT DOCUMENTS

| | | | | |
|---|---|---|---|---|
| 120,300 A * | 10/1871 | Marsh | ................................. | 4/644 |
| 126,478 A * | 5/1872 | Mott | ................................ | 4/665 |
| 133,405 A * | 11/1872 | Broadfoot | ......................... | 4/626 |
| 187,147 A * | 2/1877 | Jennings | ............................. | 4/644 |
| 328,354 A * | 10/1885 | Stears | ................................ | 4/689 |
| 2,065,009 A * | 12/1936 | Mallet | ................................ | 4/651 |
| 4,206,520 A * | 6/1980 | Fulford | ............................. | 4/665 |
| 5,201,082 A * | 4/1993 | Rockwell | .......................... | 4/665 |
| 5,243,719 A * | 9/1993 | McDonald et al. | ............... | 4/665 |
| 5,421,040 A * | 6/1995 | Oldfelt | .............................. | 4/435 |
| 5,813,047 A * | 9/1998 | Teichroeb | .......................... | 4/665 |
| 6,425,148 B1 * | 7/2002 | Chen | ................................. | 4/665 |
| 6,802,090 B2 * | 10/2004 | Martin | .............................. | 4/665 |
| 2008/0276366 A1 * | 11/2008 | Bitowft | ............................. | 4/650 |

* cited by examiner

*Primary Examiner* — Winnie Yip
(74) *Attorney, Agent, or Firm* — Abelman, Frayne, Schwab

(57) ABSTRACT

A twin tank flush device of multi-outlets, which comprises a first upper tank adapted for collection of wash water, and a second lower tank which is positioned to receive and store used wash water from the first tank, the first tank being arranged to receive water and having at least one outlet to discharge water into said second lower tank. The lower tank is arranged to selectively discharge the stored water either to a toilet to flush the toilet, or to a public drainage system, either manually or by timed discharged, to avoid overflow in the lower tank.

19 Claims, 6 Drawing Sheets

OPENABLE TWIN TANK FLUSH BOX USING RECYCLED WATER

BACKGROUND OF THE INVENTION

The invention relates to an openable twin tank toilet flush box of multi-outlets using recycled water. Openable tanks will make it easy to clean, maintain and stop residues in the flush box under hand, washing tubs by using recycled water from hand washing tubs and bathtubs to be used in toilet flush boxes of various types.

SUMMARY OF THE INVENTION

The invention relates to a twin tank flush device of multi-outlets, which comprises a first upper tank adapted for collection of wash water, and a second lower tank which is positioned to receive and store used wash water from the first tank, the first tank being arranged to receive water and having at least one outlet to discharge excess water into the second lower tank. The lower tank includes at least one conduit for directing water therefrom to a predetermined device which requires water, such as a toilet which requires flush water. Further, the lower tank preferably includes more than one conduit for directing water therefrom, at least a first conduit communicating with a toilet and at least a second conduit communicating with a public drainage system. An outlet valve is positioned in the first conduit, and a manually operable device is provided to selectively open the outlet valve to permit flush water to be directed to the toilet.

The second conduit has an inlet opening positioned at a higher level than the inlet opening of the first conduit to cause excess water to flow into the inlet opening and through the conduit to the public drainage system when the water level in the lower tank exceeds a predetermined level corresponding to the inlet opening of the second conduit.

Preferably the lower tank includes a third conduit and a third outlet valve for directing water from the lower tank to the public drainage system. Further, a timer device may be provided and adapted to open the third outlet valve at predetermined intervals of time. The first upper tank is movable to permit cleaning of the lower tank. The upper tank includes an opening for discharging used water to the lower tank, and a valve may be provided in the opening to permit selectively discharging water from the upper tank to the lower tank.

A timer may also be provided to selectively pivotably open the valve in the upper tank opening at predetermined intervals of time.

The first upper tank is preferably attached to the lower tank by hinges which permit the upward pivotable movement of the upper tank.

Additional conduits and associated valves may also be provided, depending upon needs in particular instances.

The flush boxes of the present invention open upwards. As shown in FIGS. 1 and 2, they are comprised of two parts. They are hand washing tubs of various types and shapes. They are provided with two tanks as shown in FIG. 2. The upper tank opens upwards. As shown in FIG. 3, it has an outlet 13 which may be activated with pressure in the same manner as in ordinary flush boxes. A valve 15 is provided, or valve 15 may be eliminated, and the flow of water through opening 13 can be only under the influence of gravity.

Used water can be kept in the lower tank of the flush box until used in discharging the toilets. The upper tank opens upwards to allow cleaning the lower tank, which is provided with a timer which opens an exit valve every 2 hours, to the public drainage system, with no need for chemical treatment. This tank has an advantage of opening its upper part upwards for periodic cleaning, as shown in FIG. 4, for example. It is tightly closed to eliminate leakage and escape of bad odors.

BRIEF DESCRIPTION OF THE DRAWINGS

FIG. 3 is a cross-sectional view which shows details of the flush box added under the hand wash tub that opens upwardly, and provided with:

Figure 4:
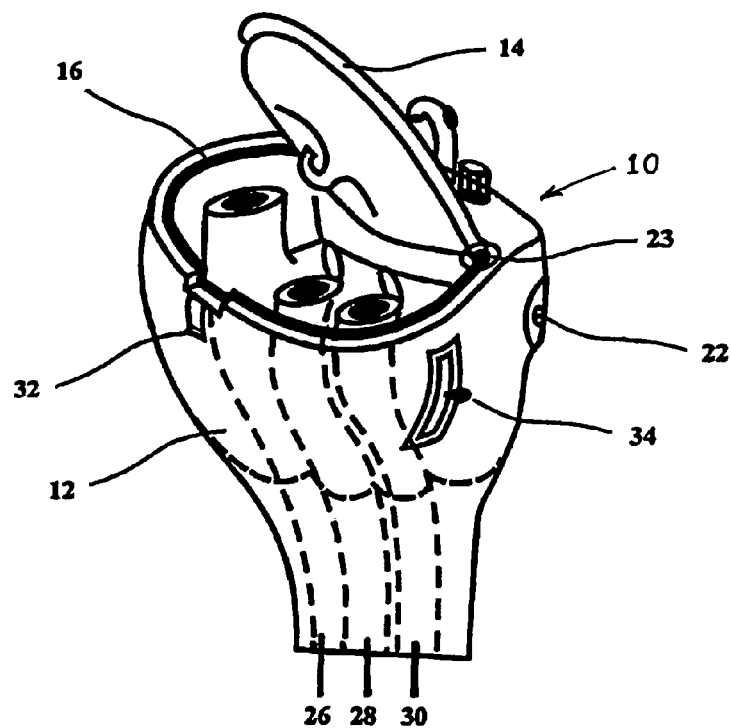
Figure 5:
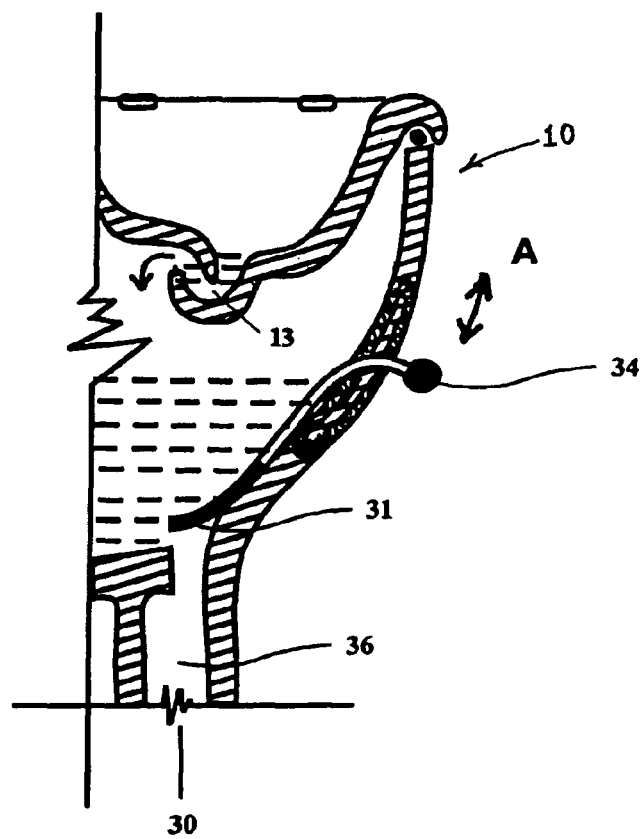
Figure 6:
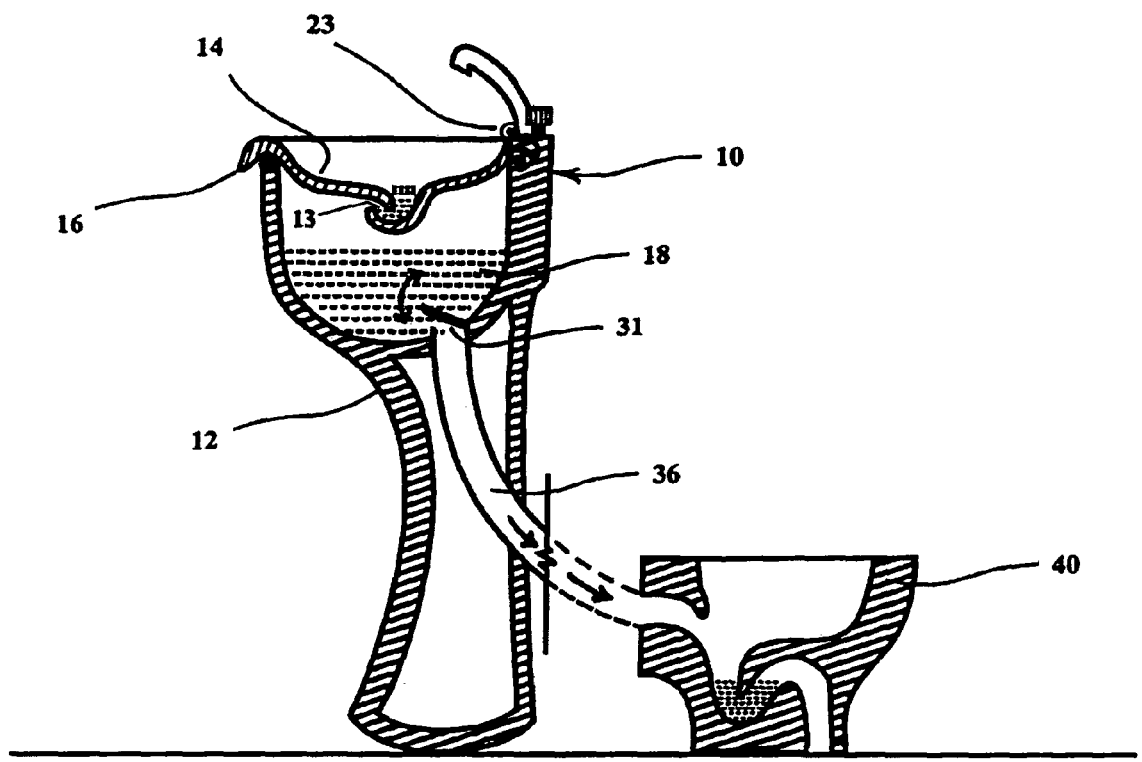

(a) an outlet which opens towards the toilet provided with a valve;

(b) an outlet which opens every 2 hours via a valve to the public drainage system; and (c) an outlet for directing excess water to a public drainage system under the openable tank;

FIG. 4 is a top and right side perspective view of the flush box of the present invention, showing in detail, the flush box with twin tank in the opened position;

FIG. 5 is a cross-sectional view of a part of the flush box of the present invention which shows in detail, the valve which opens to the toilet; and FIG. 6 is a cross-sectional view of the flush box of the present invention which shows in detail, the working mechanics between the flush box and the toilet.

DETAILED DESCRIPTION OF THE INVENTION

Figure 1:
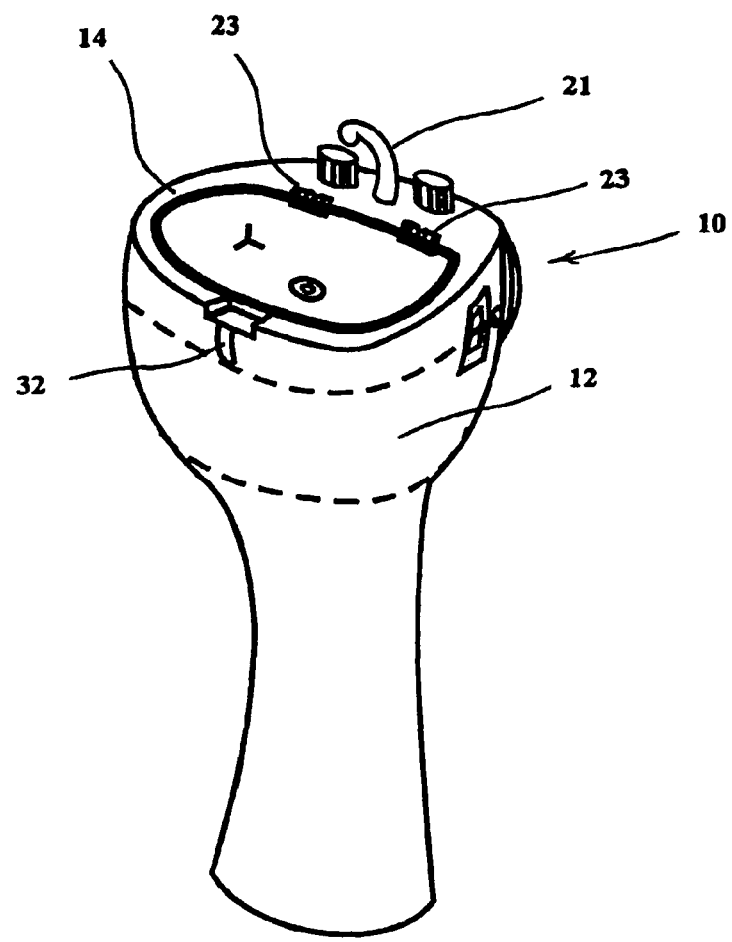
FIG. 1 is a top and right side perspective view of the flush box of the present invention added under a hand washing tub, the upper part capable of opening upwardly to allow for periodic cleaning.
Figure 2:
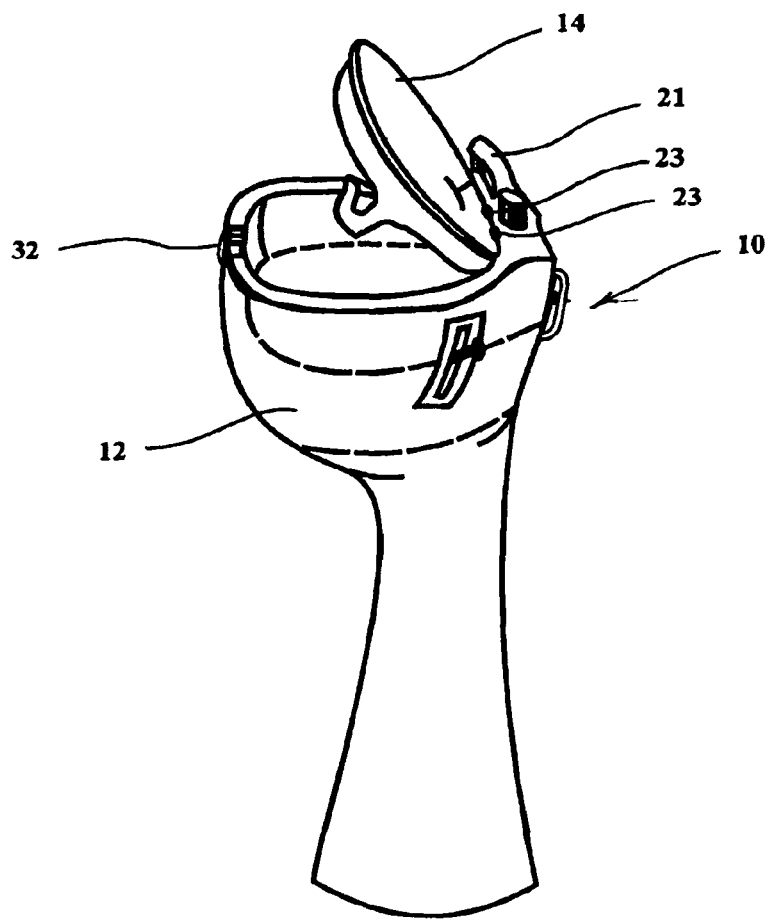
FIG. 2 is a top and right side perspective view which shows how to open the upper tank which will be made of an appropriate weight material for easy lifting.

Referring initially to FIGS. 1 and 2, the present invention relates to an openable twin tank 10 which provides a flush box or lower tank 12 under hand wash tub 14 that opens upwardly on hinges 23. The objective is to save water by recycling it. It is designed for use with hand wash tubs. As shown in FIGS. 1 and 2, upon opening the upper hand wash tub 14, periodic cleaning of the lower tank 12 can be made to stop residues and formation of bad odors.

Figure 3:
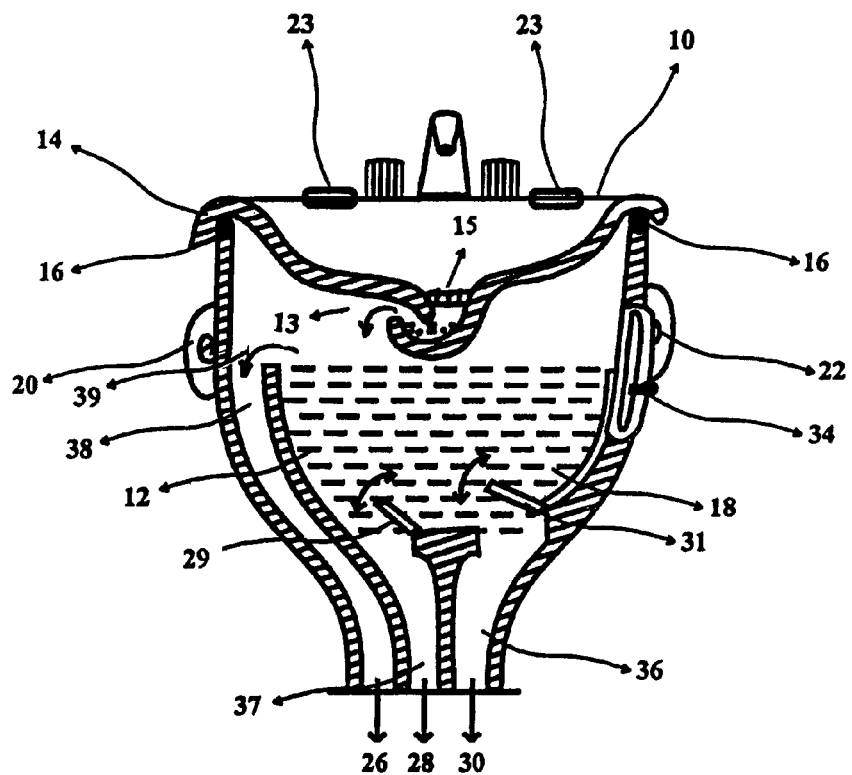

As shown further in FIGS. 1-3, twin tank 10 is comprised of two tanks under the tap 21 of the hand wash tub 14. Hand wash tub 14 is made of materials suitable for opening upwardly as shown in FIG. 2, with sealing rubber gasket 16 in engagement with both the upper and lower tanks to stop leakage of air, liquids and foul gases therebetween. Therefore the recycled water 18 will be kept for re-use in flushing the various types of toilets via outlet 30 as shown in FIG. 3.

The lower tank 12 has an automatic timer 20 which opens valve 34 by known means when the lower tank 12 is full, to direct excess water to the public drainage system via exit opening 28. A second timer 22 controls the discharge of water through exit outlet 28 up to a predetermined desired level and temperature. As shown in FIGS. 3 and 4, the lower tank 12 is provided with another outlet 26 to the public sewage system. If the lower tank 12 is prematurely filled before the auto timed outlet 28 by timer 22 and valve 34, or before the flush valve 31 is manually opened by handle 34, the excess water overflows to the public drainage system through outlet 26 via conduit 38 until the water level in tank 12 reaches the maximum level, i.e., the level which corresponds to the upper level 39 of conduit 38.

The shape of the flush box 12 is best left to technical designers to choose the suitable ones, depending on the weight of the upper tank 14, to tighten closely with the lower tank 12 by pressing the rubber gasket 16 of the lower tank 12 with a suitable lock 32 as shown in FIG. 1. The upper hand wash tub 14 may be opened by pivotably lifting it above the lower tank 12 for cleaning, with or without hinges.

Hinges 23 are optional, and other known attachments may be utilized. Alternative arrangements can provide suitable ways of lifting upper tub 14 either towards the wall, behind the tub, or towards the sides.

In operation, automatic timer 20 permits valve 29 to open at predetermined intervals, i.e., every two hours, for example, and thereby permits the flow of water through outlet 28 via conduit 37 to the public drainage system. The timer 20 can be set to open valve 29 at any desired predetermined intervals, e.g., every two hours, depending upon usage of the system. The timer 20 controls the discharge of water through conduit 37 to maintain a predetermined desired level and temperature.

As shown in FIGS. 4-6, manually operable handle 34 is provided to manually open the conduit 36 by upward movement of handle 34 which opens valve 31 to permit water to flow through outlet 30 to flush a toilet 40 as shown in FIG. 6. Arrow "A" in FIG. 5 indicates the directions of movement of handle 34 corresponding to open and closed conditions of valve 31, respectively.

As shown in FIG. 3, when the level of water 18 rises above the uppermost open end 39 of conduit 38, water will flow therethrough to the public drainage system under the influence of gravity, via conduit 38 and lower opening 26.

As can be seen in FIGS. 3 and 6, water which is used to wash hands or the like in upper wash tub 14 will flow into lower tank 12 via drain opening 13 which optionally may incorporate valve 15. Valve 15 may be manually operable by handle 34, or a separate handle, not shown, which selectively opens and closes it.

As noted previously, valve 15 may also be opened by an automatic timer, or a similar device. Alternatively, valve 15 may be eliminated to permit water to flow freely under the influence of gravity from upper wash tub 14 to lower tank 12.

Alternatively, valves 15, 31 and 34 may be remotely operable by a remote control device.

The invention claimed is:

1. A twin flush device of multi-outlets, which comprises a first upper tank adapted for collection of wash water, and a second lower tank which is positioned to receive and store used wash water from said first upper tank, said first upper tank being pivotally connected to said second lower tank and arranged to receive water and having at least one outlet to discharge water into said second lower tank, said second lower tank having a plurality of outlets, each said outlet of said second lower tank communicating with a respective conduit for discharging water from said second lower tank, a first conduit having means associated with a first of said outlets for selectively discharging water from said second lower tank to a toilet flush system, and a second conduit adapted to communicate a second of said outlets of said second lower tank with a public drainage system.

2. The twin flush tank device according to claim 1, wherein said second lower tank includes at least a third outlet which communicates with a respective third conduit to receive water from said third outlet, said third conduit adapted to discharge the water to a public drainage system.

3. The twin tank flush device according to claim 2, further comprising an outlet valve associated with said first outlet, and a manually operable device to selectively open said outlet valve to selectively permit flush water to be directed to said toilet.

4. The twin tank flush device according to claim 3, wherein said third outlet positioned at a higher level than said third outlet of said first conduit to cause excess water to flow into said third outlet and through said third conduit to be discharged to a public drainage system when the water level in said second lower tank exceeds a predetermined level corresponding to said third outlet of said third conduit.

5. The twin tank flush device according to claim 3, wherein said third outlet of said second lower tank has associated therewith, an outlet valve for selectively directing water thereto from said lower tank to said third conduit and to the public drainage system.

6. The twin tank flush device according to claim 5, further comprising a timer device adapted to open said third outlet valve of said third outlet at predetermined intervals of time.

7. The twin tank flush device according to claim 6, wherein said first upper tank is movable to permit cleaning of said lower tank.

8. The twin tank flush device according to claim 7, wherein said upper tank includes said at least one outlet for discharging used water to said lower tank, and a valve is provided in said at least one outlet to permit selectively discharging water from said upper tank to said lower tank.

9. The twin tank flush device according to claim 8, wherein a timer is provided to selectively open said valve in said first upper tank at predetermined intervals of time.

10. The twin tank flush device according to claim 9, wherein said first upper tank is attached to said second lower tank by hinges which permit said upward pivotable movement of said first upper tank.

11. The twin tank flush device according to claim 5, further comprising a timer device adapted to open said third outlet valve of said third outlet when the water level in said second lower tank reaches a predetermined level.

12. A twin tank flush device of multi-outlets, which comprises a first upper tank adapted for collecting wash water, and a second lower tank positioned below said first upper tank and adapted to receive used wash water from said first upper tank, said first upper tank being upwardly movable to permit cleaning of said second lower tank and having at least a first outlet to discharge water into said second lower tank, said second lower tank including at least two conduits for directing water therefrom, at least a first conduit having a first inlet opening for receiving wash water collected in said second lower tank and communicating through a first discharge outlet opening with a toilet system for selectively flushing a toilet, and at least a second conduit adapted to be connected through a second discharge outlet opening with a drainage system, said second conduit having an inlet opening located above said first inlet opening of said first conduit for receiving excess wash water collected in said second lower tank.

13. The twin tank flush device according to claim 12, further comprising at least a third outlet which communicates with a third conduit associated with said second lower tank and adapted to be connected with a public drainage system.

14. The twin tank flush device according to claim 13, wherein said third outlet of said second lower tank has a timer controlled valve associated therewith to permit water to flow out of said third conduit at predetermined intervals of time.

15. The twin tank flush device according to claim 13, wherein said first upper tank is pivotably mounted on said second lower tank by hinges.

16. The twin tank flush device according to claim 13, further comprising a timer device adapted to open said third outlet valve of said third outlet when the water level in said second lower tank reaches a predetermined level.

17. A twin tank flush device, which comprises a first upper tank adapted to receive hand wash water, and a second lower tank positioned below said first upper tank and adapted to receive used wash water from said first upper tank, said first upper tank being pivotable on hinges with respect to said second lower tank, and having at least one outlet to discharge excess water into said second lower tank, said second lower tank including a plurality of outlets and respectively associated conduits positioned and adapted to direct used water therefrom, at least two of said conduits adapted to be connected with a public drainage system and at least one of said remaining conduits being connected with at least one of said outlets and being associated with at least one toilet flush system to permit used wash water to be selectively directed to said toilet flush system for flushing said toilet system, said outlet associated with said toilet flush system having associated therewith a manually operable valve to permit selective opening of said outlet to flush said toilet system associated therewith, at least one of said conduits adapted to be connected with a public drainage system having associated therewith a valve to permit water to flow out of said conduit under predetermined conditions.

18. The twin tank flush device according to claim 17, further comprising a timer device adapted to open said valve at predetermined intervals of time.

19. The twin tank flush device according to claim 18 further comprising a control device which permits water to flow out of at least one of said drainage conduits when the water level in said second lower tank reaches a predetermined level.

\* \* \* \* \*